United States Patent
Dalton et al.

(12) 
(10) Patent No.: US 6,246,211 B1
(45) Date of Patent: Jun. 12, 2001

(54) SMART CHARGER

(75) Inventors: Dan Dalton, Greeley; James C Dow, Ft Collins; Andrew C Goris, Loveland; Barry K Hansen, Fort Collins; Eugene A Miksch, Loveland; Mary E Moses; Thomas C Oliver, both of Windsor, all of CO (US); Scott Henderson, Brooklyn, NY (US); Daniel Formosa, Montvale, NJ (US); Davin Stowell, New York; Anthony Di Bitonto, Brooklyn, both of NY (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/487,056

(22) Filed: Jan. 19, 2000

(51) Int. Cl.[7] ............................ H02J 7/00; G06F 13/12
(52) U.S. Cl. ............................ 320/114; 320/103; 710/72
(58) Field of Search .................................. 320/114, 103; 710/72; 455/556; 361/379–384

(56) References Cited

U.S. PATENT DOCUMENTS

| 5,504,413 | * | 4/1996 | Fernandez et al. | 320/163 |
| 5,606,594 | * | 2/1997 | Register et al. | 455/550 |
| 5,625,673 | * | 4/1997 | Grewe et al. | 455/556 |
| 5,739,665 | * | 4/1998 | Bares | 320/115 |
| 6,004,060 | * | 12/1999 | Bedol | 402/4 |
| 6,119,179 | * | 9/2000 | Whitridge et al. | 710/72 |
| 6,134,105 | * | 10/2000 | Leuker | 361/683 |

FOREIGN PATENT DOCUMENTS 9-283456 * 4/1999 (JP) .

* cited by examiner

Primary Examiner—Peter S. Wong
Assistant Examiner—Gregory J. Toatley, Jr.

(57) ABSTRACT

A smart charger that includes a housing with an interface for power and data transmission and adapted for connection to a communication device, with a second interface adapted for connection to a power source, and with a third interface adapted for connection to a second communication device. A charger within the housing is connected to the second interface to receive power, and connected to the first interface to provide charging power. A control module within the housing provides for communication between the first interface and the third interface.

8 Claims, 2 Drawing Sheets

SMART CHARGER

BACKGROUND OF THE INVENTION

The present invention relates generally to interface devices, and more particularly to a smart wall charger for creating an interface between a portable capture device and a variety of other devices.

There exists a need for a portable, light-weight device to allow a portable capture device such as a portable scanner or digital camera to be able to communicate with another communication device.

SUMMARY OF THE INVENTION

The present invention comprises, in one embodiment, a smart charger including: a housing with a first interface for power transmission and data transmission and adapted for connection to a first communication device, with a second interface adapted for connection to a power source, and with a third interface adapted for connection to a second communication device; a charger disposed within the housing and connected to the second interface to receive power, and connected to the first interface to provide charging power; and a control module disposed within the housing and connected to receive information from the first interface and to provide output information to the third interface. The first interface may be adapted to communicate, by way of example, to a scanner or a digital camera, and the third interface may be adapted to communicate with a printer, computing resource or other appropriate interface.

In one aspect of the present invention, the first interface includes a data interface and control module to translate data received at the first interface from a first data protocol to a second data protocol for communication to the third interface.

In a further aspect of the present invention, the data interface and control module includes a wireless interface chip for receiving wireless communication at the first interface.

In a yet further aspect of the present invention, the first interface is adapted to communicate with an information capture device; and the third interface includes a telephone line interface and a computing resource interface; and further comprises a data interface and control module to translate data received from the first interface from a first data protocol to a second data protocol and logic for selecting the telephone line interface or computing resource interface.

In a further aspect of the present invention, a user interface is provided to allow for a user to select the telephone line interface or computing resource interface at the third interface.

In a second embodiment of the present invention, a smart charger is provided, comprising: a housing with a first interface for power transmission and data transmission and adapted for connection to a first communication device, with a second interface adapted for connection to a power source, and with a third interface with at least two I/O ports, with each I/O port adapted for communication with a different type of second communication device; a charger disposed within the housing and connected to the second interface to receive power, and connected to the first interface to provide charging power; and an I/O control module adapted for selecting one of the I/O ports at the third interface for data communication with the first interface.

DETAILED DESCRIPTION OF THE PREFERRED EMBODIMENT

Figure 1:
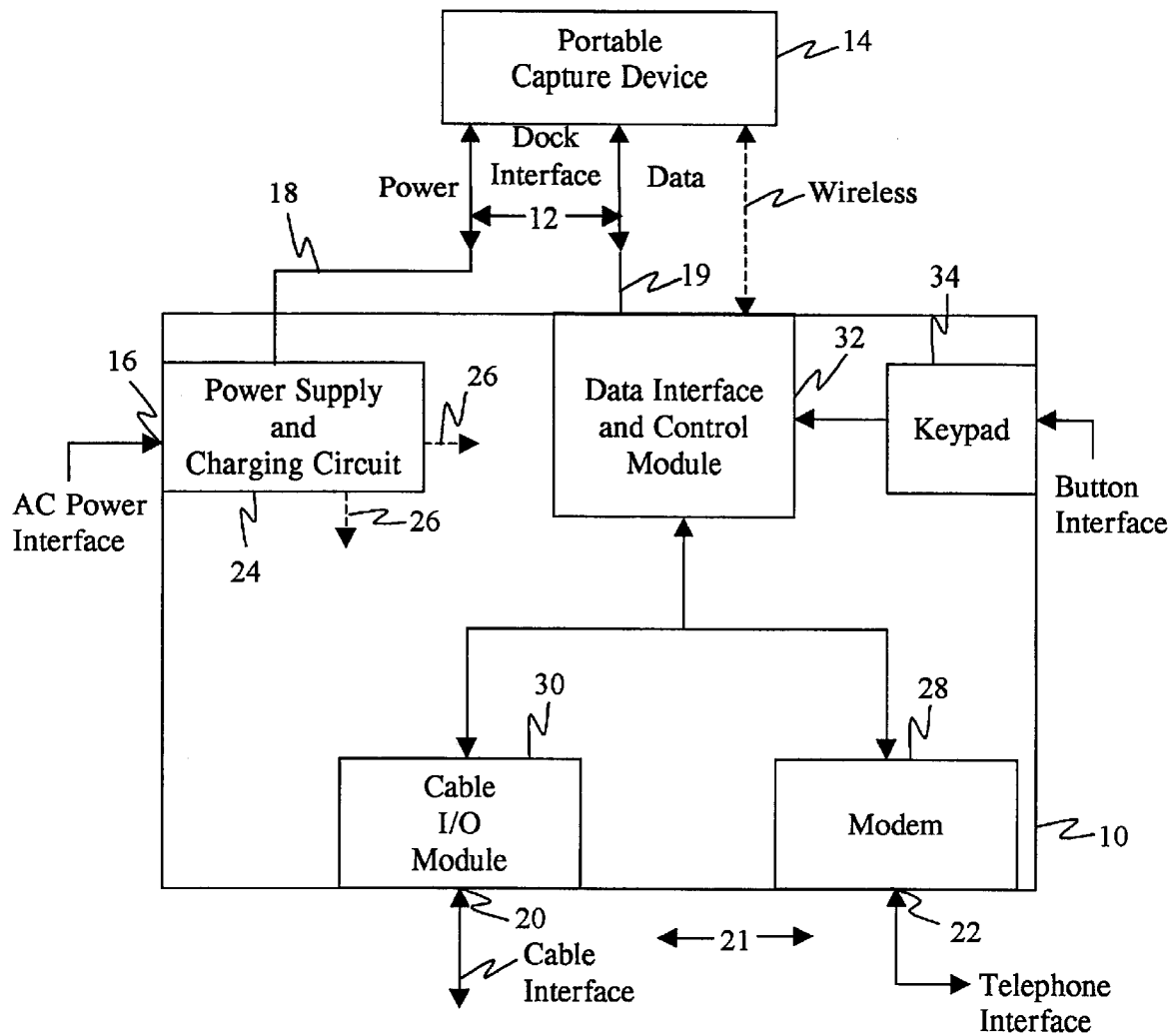
FIG. 1 is a schematic block diagram of a preferred embodiment of the present invention.

The present invention is directed to a charging device for providing an interface between a first communication device and a second communication device, while at the same time providing a charging capability. Referring to FIG. 1, there is shown a housing 10 with a first interface 12 for power transmission and data transmission adapted for connection to a first communication device 14. The data transmission interface may be designed for an electrical contact (docked) connection and/or may include a standard wireless (undocked) interface module using an IR protocol, a Bluetooth protocol, or some other appropriate protocol to be discussed below. Note that a docked connection is necessary if it is desired to recharge the batteries in the first communication device.

A typical class of communication devices 14 might comprise a portable scanner such as the Hewlett Packard CapShare 920 portable e-copier. The CapShare 920 has a device size of 5.5 L by 4.1 H by 1.5 W (inches), a device weight with two batteries of 12.5 ounces, and is capable of capturing sizes from business cards to legal size documents or flip charts. Page storage for current devices comprise about 50 letter-size documents. Such devices include approximately 4 MB of memory. The CapShare 920 supports receiver devices such as IBM Compatible PCs, handheld PCs running Windows CE, Psion Series 5 handheld PCs, HP Laser Jet 5P/6P/2100 printers, Cannon BJC-80/BJC-50 printers, Citizen P60i printers, the Nokia Communicator, and a variety of other IR printers, communicators, and JetSend Direct Connect devices. The CapShare 920 includes software specifications to interface with IBM-Compatible PCs running Microsoft Windows 95, Windows 98, or NT 4.0, handheld PCs running Windows CE, and Psion Series 5 handheld PCs running EPOC32. It can also manipulate files directly with Microsoft Explorer as Adobe Acrobat Reader PDF and TIFF files and XIF to ScanSoft Pagis Pro 2.0. It also includes IR send capability of 4 Mbps (IrDA-compliant infrared) (5–15 second/letter-size page). It has a serial send rate of 115 KBPS. The CapShare 920 is powered by two AA NiMH or NiCd rechargeable batteries.

It should be noted that the HP CapShare 920 is exemplary of a class of devices. However, the size of the CapShare 920 is not exemplary and should be reduced and structure must be added to the CapShare 920 to permit the charging of the batteries. A variety of other information capture devices may be utilized with the present invention including digital cameras.

Note that such portable capture devices must periodically be recharged in order to operate. Accordingly, a battery charger is an essential element. The present invention provides enhanced capabilities for this essential charger element.

Figure 2:
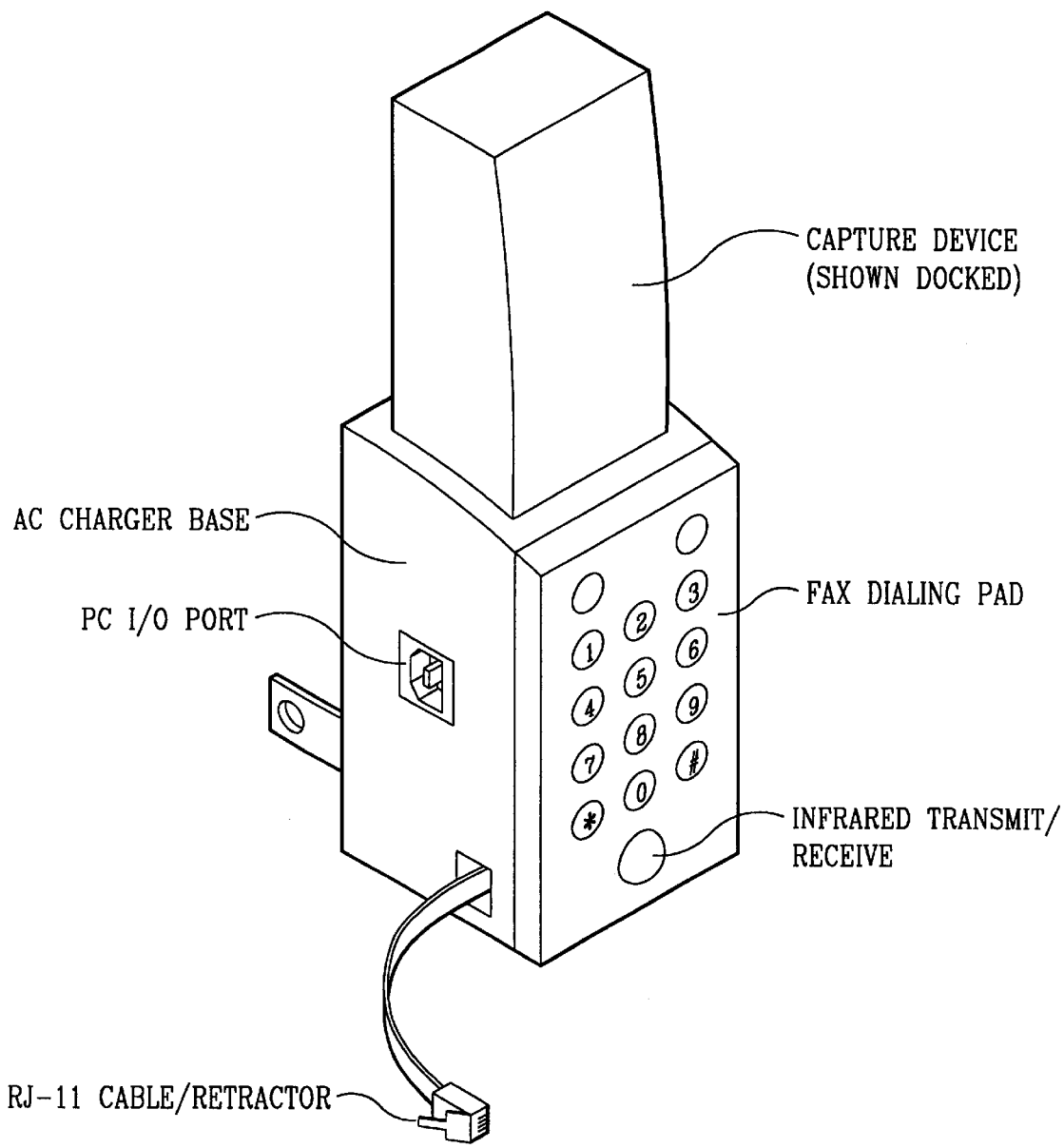
FIG. 2 is a schematic diagram of one preferred configuration for the present invention.

The first interface 12, in a preferred embodiment, includes a recess 13 (shown in FIG. 2) formed into one side of the housing 10 for receiving the portable capture device 14 and providing a direct electrical contact interface. This recess 13 may conveniently include electrode terminals 18 for a power interface and including a ground line, and electrode terminals 19 for a data interface. Additional terminals may be provided depending on the electrical configuration of the portable capture device 14.

The housing further includes a second interface 16 adapted for connection to a power source. This second interface 16 is connected to a charger 24 disposed within the housing 10. It should be noted that the charging circuit may be implemented by a standard charging circuit for charging rechargeable batteries of the type that may be used in the capture device 14 to convert AC to DC. Alternatively, the charger 24 may include more elaborate charging capability. The charger 24 is connected to power terminals for the first interface 12 to provide charging power thereto and is also connected via lines 26 to provide power to various other modules and devices (to be discussed below) within the housing 10. Note that if a wireless interface (to be discussed below) is included in the first interface 12, then it may be desirable to include a battery pack to power the various modules in the housing 10 during this wireless communication. However, such a battery pack is not essential because the smart charger could be connected to an external power source during such wireless communication.

The housing 10 further includes a third interface 21 for connection to at least one second communication device. This second communication device may be a fax machine, or an e-mail application, or a PC device or any of a variety of other communication devices. In the most elementary embodiment of the present invention, this third interface would comprise a single interface to one type of device. By way of example, this third interface 21 could comprise a telephone interface 22, i.e., an RJ-11 cable/retractor. Alternatively, the third interface could comprise a cable I/O interface 20.

In a preferred embodiment, a modem 28 and a keypad 34 may be included within the housing 10. The modem 28 connects to the telephone interface 22 and may be implemented by any module that provides modem capability. The keypad 34 may be implemented by a standard dialing pad. The keypad 34 would include a standard set of numbers, and at least a "send" button. The modem 28 is capable of communicating through the interface 22 with fax machines and e-mail applications.

Alternatively, or in addition, if a cable interface 20 is provided for the third interface 21, then a cable I/O module 30 would be provided within the housing 10. By way of example, if this cable I/O module 30 were serial, then it could be implemented by a standard RS 232 interchange chip such as the ADM101E from Analog Devices, Norwood, Mass.

As noted above, the first interface 12 includes a data transmission interface 19. To facilitate data communication between the portable capture device 14 and other communication devices that may operate with different data protocols, it will generally be necessary to provide a module to translate from one data protocol to another, unless such a translation is performed in the portable capture device. Accordingly, a data interface and control module 32 is provided in a preferred embodiment which is connected to the interface 19 and to the modules 28 and 30. In a preferred embodiment, the data interface and control module 32 operates data packet protocols and error correction procedures to manage packet level information, i.e., to build up the received data into packets, verify the data, and then translate the data packets to an appropriate protocol required for the third interface 21 (20/22). The module 32 may be implemented as a controller with a processor and a memory.

If the third interface 21 includes more than one interface, as is shown in FIG. 1, then data interface and control module 32 would include logic to select which of the interfaces 20 or 22 in the third interface 21 that the first interface will communicate with. For example, the logic could include memory mapped I/O or some other convenient addressing logic. In a preferred embodiment, this logic in the data interface and control module 32 is controlled by the keypad 34.

A wireless interface could be included as part of the data interface and control module 32. If a wireless I/O interface is included in the module 32 for communicating with the portable capture device 14, then a wireless I/O chip would be provided within the module 32. A variety of wireless protocols may be implemented by such a chip. By way of example, a protocol called Bluetooth may be utilized that uses radio-frequency waves to allow PCs, cell phones, PDAs, and other devices to communicate with each other over short distances. Alternatively, an IR protocol could be utilized and an IR receive/transmit chip could be included in the module 32. By way of example, a variety of IR receive/transmit chips are available to implement SIR and FIR protocols. It should be noted that if the smart charger is to be implemented for I/R communication, then an infrared transmit/receive diode or other appropriate I/R receiver/transmitter 40 (see FIG. 2) may be utilized.

Accordingly, it can be seen that the module 32 in combination with keypad 34 may be used to allow a user to select one of a telephone line interface, or a computing resource interface or other convenient interface. Thus, a user can scan or otherwise copy a document or other information using a handheld scanner or other device and can immediately send that information to a second communication device by means of the smart charger. The smart charger can communicate in its preferred embodiment with either a fax machine, or an e-mail application, or a PDA, or a printer, or a PC via a variety of interfaces.

The housing 10 can be constructed of any of a variety of standard materials used for DC chargers, cell phones and other appliances. Typically, this material would be a fire retardant plastic or ABS. However, the present invention is not limited to any particular material. It should be noted that the internal wiring between interfaces could be accomplished by means of a printed circuit board, or via interconnect cable. The interfaces in a preferred embodiment would talk to each other by means of a serial or parallel databus.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and their equivalents.

We claim:

1. A smart charger, comprising:
   a housing with a first interface for power transmission and data transmission of a graphic image data file and adapted for connection to a graphic image device, with a second interface adapted for connection to a power source, and with a third interface adapted for connection to a communication device where said third interface comprises at least one of a fax/modem port and standard PC I/O port;
   a charger disposed within said housing and connected to said second interface to receive power, and connected to said first interface to provide charging power; and a control module disposed within said housing and connected to receive information from said first interface and to communicate information to said third interface wherein said first interface includes a data interface and control module to translate data received at said first interface from a first data protocol to one of RS232, USB, ethernet, and modem protocols for communication to said third interface.

2. A smart charger as defined in claim 1, wherein said first interface is adapted to communicate with a scanner.

3. A smart charger as defined in claim 1, wherein said first interface is adapted to communicate with a digital camera.

4. A smart charger as defined in claim 1, wherein said third interface is adapted to communicate with a computing resource.

5. A smart charger as defined in claim 1, wherein said third interface is adapted to communicate with a printer.

6. A smart charger as defined in claim 1, wherein said data interface and control module includes a wireless interface chip for receiving wireless communication at said first interface.

7. A smart charger as defined in claim 1, further comprising a user interface for a user to select one of said fax/modem port and said standard PC I/O port.

8. A smart charger as defined in claim 1, wherein said control module is powered by said charger.

* * * * *